United States Patent
Hamai (10) Patent No.: US 8,952,657 B2
(45) Date of Patent: Feb. 10, 2015

(54) BATTERY PROTECTOR

(71) Applicant: Suzuki Motor Corporation, Shizuoka (JP)

(72) Inventor: Atsushi Hamai, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 202 days.

(21) Appl. No.: 13/654,181

(22) Filed: Oct. 17, 2012

(65) Prior Publication Data

US 2013/0107404 A1 May 2, 2013

(30) Foreign Application Priority Data

Oct. 27, 2011 (JP) .................................. 2011-235550

(51) Int. Cl.
*H01M 6/50* (2006.01)
*B60W 20/00* (2006.01)
*H02H 9/02* (2006.01)
*B60L 11/18* (2006.01)
(Continued)

(52) U.S. Cl.
CPC .............. *H02H 9/02* (2013.01); *Y02T 10/7077* (2013.01); *B60W 20/106* (2013.01); *H02J 2007/0039* (2013.01); *B60L 11/1851* (2013.01); *H01M 10/48* (2013.01); *H01M 10/44* (2013.01); *Y02T 10/7005* (2013.01); *B60L 11/12* (2013.01); *B60K 6/46* (2013.01); *H01M 10/46* (2013.01); *B60W 10/08* (2013.01); *Y02T 10/705* (2013.01); *Y02T 10/6217* (2013.01); *H01M 2220/20* (2013.01)
USPC ............................. 320/109; 307/10.7; 307/43

(58) Field of Classification Search
USPC ............................................. 320/109; 361/63
See application file for complete search history.

(56) References Cited

U.S. PATENT DOCUMENTS

2009/0230766 A1* 9/2009 Miyama et al. ............... 307/10.7
2010/0204864 A1* 8/2010 Ando et al. ...................... 701/22
(Continued)

FOREIGN PATENT DOCUMENTS

JP 2010178446 A 8/2010
JP 2010-193630 A 9/2010

OTHER PUBLICATIONS

JP-2010-193630; Power storage control device and working machine; Abstract, Specification, Drawings.*

(Continued)

*Primary Examiner* — Dharti Patel
(74) *Attorney, Agent, or Firm* — Rothwell, Figg, Ernst & Manbeck, P.C.

(57) ABSTRACT

A battery is protected without realizing the state of every vehicle element connected to the battery or the battery input/output current. A current limit value setting unit sets a current limit value for limiting the battery input/output current in accordance with state of the battery. A limiting current ratio calculation unit calculates a ratio of the current limit value set by the current limit value setting unit to a detected battery current value. A request limit coefficient calculation unit calculates a limit coefficient for limiting a request value for driving respective vehicle components based on the ratio calculated by the limiting current ratio calculation unit. In addition, a final request value calculation unit calculates as a final request value for the respective vehicle components, respective multiplication values resulting from multiplying the respective request values for the respective components by the limit coefficient calculated by the request limit coefficient calculation unit.

5 Claims, 5 Drawing Sheets (51) Int. Cl.
- *H01M 10/48* (2006.01)
- *B60L 11/12* (2006.01)
- *B60K 6/46* (2007.10)
- *H01M 10/46* (2006.01)
- *B60W 10/08* (2006.01)
- *H02H 7/18* (2006.01)
- *H02J 1/10* (2006.01)
- *B60Q 1/00* (2006.01)
- *H02J 7/00* (2006.01)
- *H01M 10/44* (2006.01)

(56) References Cited

U.S. PATENT DOCUMENTS

| | | |
|---|---|---|
| 2011/0127958 A1* | 6/2011 | Ishishita et al. ............... 320/109 |
| 2011/0273141 A1 | 11/2011 | Kanbayashi et al. |
| 2012/0188068 A1* | 7/2012 | Hanna et al. ................... 340/441 |
| 2012/0274137 A1* | 11/2012 | Yoshida et al. ................ 307/43 |

OTHER PUBLICATIONS

Office Action mailed Aug. 29, 2014 in corresponding Chinese Patent Application No. 201210419420.4 (with an English translation) (9 pages).

* cited by examiner

BATTERY PROTECTOR

CROSS-REFERENCE

This document claims priority to Japanese Application Number 2011-235550, filed Oct. 27, 2011, the entire content of which is hereby incorporated by reference.

TECHNICAL FIELD

The present invention relates to protection of a battery embedded in a hybrid vehicle.

BACKGROUND ART

Conventional hybrid vehicles, which are improved in fuel saving by driving with a motor in addition to an engine, compensate for motor drive or other necessary electrical power by power of a battery embedded in the vehicle. These hybrid vehicles control charge and discharge by charging the battery with kinetic energy used as regenerative electric power during deceleration.

In this type of hybrid vehicle, it is difficult to maintain the running and the vehicle system if discharge continues when the battery residual quantity is extremely low. This type of hybrid vehicle may also lead to degradation and malfunction of battery performance when excessive amounts of charges and discharges of the battery continue for a long period of time.

Therefore, in the hybrid vehicle, a control method for limiting incoming and outgoing electric current is needed in light of battery protection. A control method of a high-order controller of controlling a system to limit the incoming and outgoing electric current is known as such a control method (See Patent Document 1, for example).

PRIOR ART

Patent Document

Patent Document 1: JP 2010-193630 A

DISCLOSURE OF THE INVENTION

Problem to be Solved

However, in the control method of the high-order controller of controlling the system to limit the incoming and outgoing electric current, it is necessary to realize the state and incoming and outgoing electric current for each component (namely vehicle constituent element) connected to the battery. Therefore, the more components are connected to the battery, the more information realized by the high-order controller, which may lead to a complicated control method thereof.

The present invention has an object to protect the battery without the necessity of realizing the state and incoming and outgoing electric current for each vehicle constituent element connected to the battery.

Solution to the Problem

In order to resolve the aforementioned problem, according to an aspect of the present invention, there is provided a battery protector for protecting a battery of a vehicle including an engine, a power generator motor driven by the engine and controlled based on a request value, a drive motor to be controlled based on a request value and to drive driving wheels, a battery for storing generated electric power from the power generator motor and regenerative power from the drive motor and for supplying electric power for powering to the drive motor, the battery protector comprising: a battery input/output current index value acquiring unit for acquiring an index value for input/output current to/from the battery; a limit value setting unit for setting a limit value for limiting the input/output current to/from the battery in accordance with a state of the battery; a ratio calculation unit for calculating a ratio of the limit value set by the limit value setting unit to the index value acquired by the battery input/output current index value acquiring unit; a limit coefficient calculation unit for calculating a limit coefficient for limiting a request value for driving respective vehicle components including at least the power generator motor and the drive motor for carrying out input/output of current to/from the battery based on the ratio of the limit value calculated by the ratio calculation unit; and a final request value calculation unit for calculating respective multiplication values resulting from multiplying the respective request values for the respective vehicle components by the limit coefficient calculated by the limit coefficient calculation unit, as a final request value for drive controlling of the respective vehicle components.

In the above configuration, the battery input/output current index value acquiring unit may acquire a battery current value as the index value, the limit value setting unit may set as the limit value, a current value for limiting the input/output current to/from the battery, and the ratio calculation unit may calculate a ratio of the limit value set by the limit value setting unit to the battery current value acquired by the battery input/output current index value acquiring unit.

In the above configuration, the battery input/output current index value acquiring unit acquires as the index value a multiplication value by multiplying the battery current value by the battery voltage value, the limit value setting unit sets as the limit value a power value for limiting the input/output power to/from the battery, and the ratio calculation unit calculates a ratio of the limit value set by the limit value setting unit to the multiplication value acquired by the battery input/output current index value acquiring unit.

In the above configuration, the ratio calculation unit may increase the ratio, as the battery current value becomes closer to the limit value, and the limit coefficient calculation unit may decrease the limit coefficient, as the ratio increases.

In the above configuration, the limit coefficient calculation unit may calculate the limit coefficient for every one of the respective vehicle components.

Advantageous Effect of the Invention

According to an aspect of the invention, it is possible to protect a battery by limiting input/output current to/from the battery without monitoring the state of each vehicle component, which inputs/outputs current to/from the battery for the power generator motor, the drive motor, or the like and input/output current to/from the same.

In addition, the use of the battery current value allows easy limitation of the input/output current to/from the battery.

Furthermore, the use of the input/output power value to/from the battery allows easy limitation of input/output current to/from the battery.

Moreover, since the limit coefficient is decreased, as the battery current value becomes closer to the current limit value, the final request value calculated using the limit coefficient is also made small. As a result, according to the present invention, the final request value for every vehicle component is limited to be smaller, as the battery current value becomes closer to the current limit value. Accordingly, the present invention is capable of limiting input/output current to/from the battery as the battery current value becomes closer to the current limit value.

Additionally, it is possible to limit the input/output current to/from battery for every vehicle component.

DESCRIPTION OF EMBODIMENTS

An embodiment of the present invention will now be described with reference to the drawings.

The present embodiment is a hybrid system of a series-type hybrid vehicle.
(Configuration)

Figure 1:
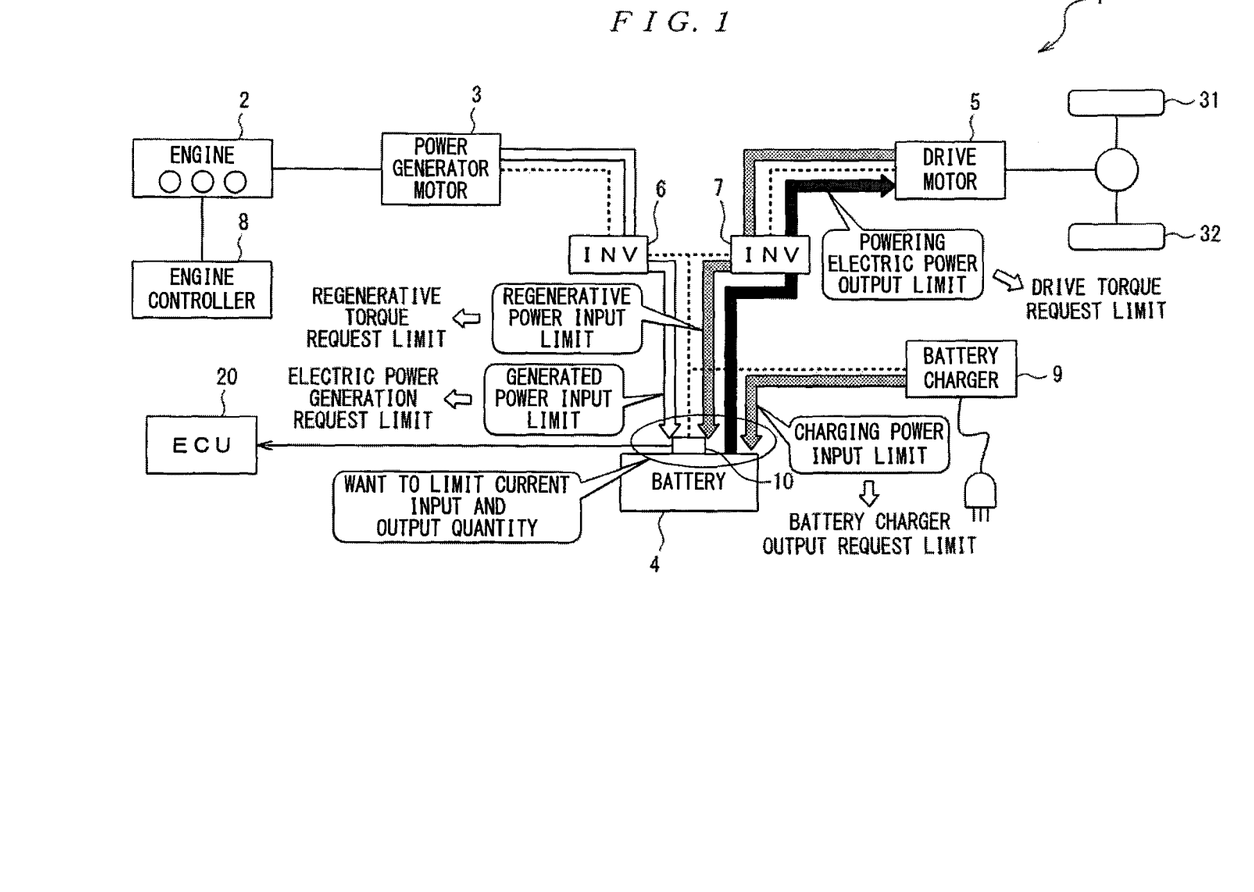
FIG. 1 is a diagram illustrative of a configuration example of a hybrid system for a series-type hybrid vehicle according to an embodiment.

FIG. 1 is a diagram illustrative of a configuration example of a hybrid system 1 for a series-type hybrid vehicle. Referring to FIG. 1, the hybrid system 1 for a series-type hybrid vehicle is configured such that an output shaft of an engine 2 is serially connected to an input shaft of a power generator motor 3, so that a drive motor 5 is rotated either by the generated power from the power generator motor 3 or by the discharged power from a battery 4 so as to drive driving wheels 31 and 32.

As shown in FIG. 1, the vehicle in which the hybrid system 1 is embedded includes the engine 2, the power generator motor 3, the battery (e.g., high-voltage battery) 4, the drive motor 5, a power generator motor inverter 6, a drive motor inverter 7, an engine controller 8, a battery charger 9, a battery current sensor 10, and an electronic control unit (ECU) 20.

In such a configuration, the battery current sensor 10 detects actual current of the battery 4. The battery current sensor 10 then outputs the detected value to the ECU 20. Note that while it is omitted from the drawing, the vehicle has various sensors constituting the hybrid system 1, such as a sensor for detecting rotation speeds of the power generator motor 3 and the drive motor 5.

The ECU 20 is constituted by a controller including a microcomputer and peripheral circuits thereof. For example, the ECU 20 is constituted by a CPU, ROM, RAM, etc. The ROM stores one or more programs for implementing various processing. The CPU carries out various processing in accordance with the one or more programs stored in the ROM. In the present embodiment, the ECU 20 is a hybrid controller, for example.

The ECU (hereinafter, referred to as hybrid controller) 20 carries out various control for driving the engine 2, the power generator motor 3, and the drive motor 5 based on the detected values from the battery current sensor 10 and the like. For this end, the hybrid controller 20 outputs an engine drive request to the engine controller 8 for controlling driving of the engine 2. The hybrid controller 20 also outputs a power generator motor torque request to the power generator motor inverter 6 for controlling the driving of the power generator motor 3. Moreover, the hybrid controller 20 outputs a drive motor torque request to the drive motor inverter 7 for controlling the driving of the drive motor 5.

In the present embodiment, the hybrid controller 20 carries out processing for limiting the driving of each component (the power generator motor 3, the drive motor 5, the battery charger 9, etc.) connected to the battery 4, so that the input and output (or charge and discharge) is limited to and from the battery 4. This limiting process will be described later.

The engine controller 8 is constituted by a controller including a microcomputer and peripheral circuits thereof. For example, the engine controller 8 is constituted by a CPU, ROM, RAM, etc., as in a typical ECU. The ROM stores one or more programs for implementing various processing. The CPU carries out various processing in accordance with the one or more programs stored in the ROM.

The engine controller 8 controls the rotation speed and the torque of the engine 2 in response to the engine drive request from the hybrid controller 20. The engine controller 8 controls the rotation speed and the torque of the engine 2 by controlling a throttle opening angle of a throttle valve, a fuel injection quantity, etc. of the engine 2, for example.

Meanwhile, the power generator motor inverter 6 controls the driving of the power generator motor 3. More specifically, the power generator motor inverter 6 controls each phase of the power generator motor 3 by adjusting the drive current of each phase based on a request torque (final request torque in the present embodiment) from the hybrid controller 20 so as to control the power generation by the power generator motor 3.

The power generator motor 3 has its rotating shaft connected to an output shaft of the engine 2. Thus, the power generator motor 3 generates the power by the driving force of the engine 2. The power generator motor 3 supplies the generated power to either the battery 4 or the drive motor 5. The battery 4 is connected to the power generator motor 3 and the drive motor 5, and is charged by the power generated by the power generator motor 3 or the power (namely regenerative electric power) generated by the drive motor 5.

Meanwhile, the drive motor inverter 7 controls driving of the drive motor 5. Specifically, the drive motor inverter 7 controls each phase of the drive motor 5 by adjusting the drive current of each phase in response to the request torque (final request torque in the present embodiment) from the hybrid controller 20, and therefore controls powering and regeneration of the drive motor 5.

The drive motor 5 is connected to a driving shaft connected to driving wheels 31 and 32. The drive motor 5 is driven by the generated power by the power generator motor 3 or the power (or discharge electric power) output from the battery 4. In this manner, the drive motor 5 drives the driving shaft to drive the driving wheels 31 and 32.

The battery charger 9 charges the battery 4 using a commercial power supply. A high-order controller, such as the hybrid controller 20, controls the battery charger 9 to charge. As a result, the high-order controller controls an amount of charge, a charging time, etc. for the battery 4 controlled by the battery charger 9, in response to a request at the time of charge control.

An example of the control processing of the hybrid controller 20 in this embodiment will be described next.

Figure 2:
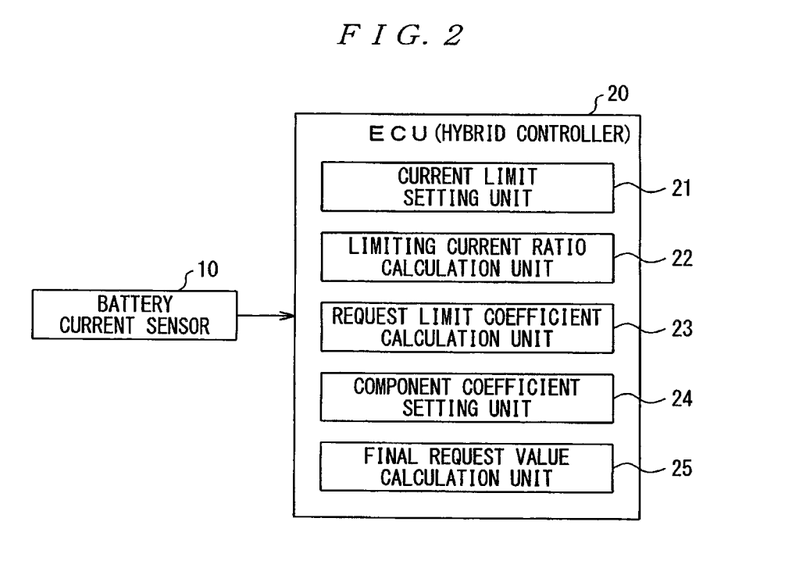
FIG. 2 is a block diagram illustrative of a configuration example of a hybrid controller (ECU: Electronic Control Unit)

FIG. 2 is a diagram illustrative of a configuration example of the hybrid controller 20 for limit processing.

As shown in FIG. 2, the hybrid controller 20 includes a current limit value setting unit 21, a limiting current ratio calculation unit 22, a request limit coefficient calculation unit 23, a component coefficient setting unit 24, and a final request value calculation unit 25.

The current limit value setting unit 21 sets a current limit value for limiting input/output current to/from the battery 4. The current limit value setting unit 21 then outputs the set current limit value to the limiting current ratio calculation unit 22.

In this case, the current limit value setting unit 21 sets a current limit value with the same sign as that indicating the input/output of the battery current value. The battery current value (namely input/output current value) is a value represented with a positive or negative sign depending on the input/output direction of current. For example, the current value is a positive one, in the case of outputting (or discharging) current from the battery 4, and is a negative one, in the case of inputting (or charging) current to the battery 4. Given this situation in this embodiment, the current limit value setting unit 21 sets a current limit value for limiting the current output from the battery 4 to a positive value and sets a current limit value for limiting the current input to the battery 4 to a negative value such that these current limit values have same signs as those indicating the input and the output of battery current, respectively.

Moreover, in the case of such signs, the input to the battery 4 occurs, when the electric power generation is request to the power generator motor 3, when the regeneration is request to the drive motor 5, and when the charging is request to the battery charger 9. Accordingly, in the case of such signs, a negative current limit value causes a limitation. Since the output from the battery 4 occurs, when powering is request to the drive motor 5, a positive current limit value causes a limitation. Therefore, in the case of such signs, the drive motor 5 is limited by both positive and negative current limit values in powering action and regenerative action.

Furthermore, the current limit value setting unit 21 sets the current limit value based on the state of the battery 4, for example, such as liquid temperature of the battery 4, state of charge (SOC) of the battery 4, etc. For example, when the liquid temperature of the battery 4 is low at the time of charging, the input current to the battery 4 cannot be made large. Thus, the current limit value setting unit 21 sets the current limit value to a value further limiting the input current to the battery 4, as the liquid temperature of the battery 4 is lower.

The limiting current ratio calculation unit 22 calculates a ratio of the battery current value (actual current value) detected by the battery current sensor 10 to the current limit value set by the current limit value setting unit 21 (hereinafter, battery current value/current limit value will be referred to as limiting current ratio in the present embodiment). The limiting current ratio calculation unit 22 then outputs the calculated limiting current ratio to the request limit coefficient calculation unit 23.

The request limit coefficient calculation unit 23 calculates a request limit coefficient corresponding to the limiting current ratio calculated by the limiting current ratio calculation unit 22. The request limit coefficient calculation unit 23 then outputs the calculated request limit coefficient to the final request value calculation unit 25.

The final request value calculation unit 25 calculates a final request value based on the request value for the components and the request limit coefficient. At this time, the final request value calculation unit 25 calculates the final request value also using a coefficient (e.g., coefficient less than or equal to 1) for each component set by the component coefficient setting unit 24. The component coefficient setting unit 24 holds coefficients corresponding to respective components in a table or another form, for example.

Figure 3:
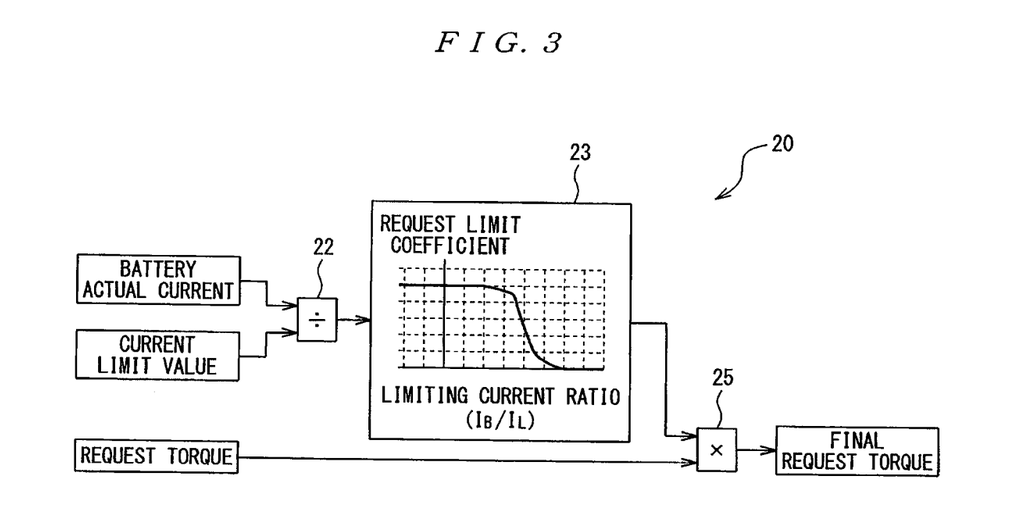
FIG. 3 is a block diagram illustrative of a specific configuration example of the ECU.

FIG. 3 is a diagram illustrative of a specific configuration example of the hybrid controller 20. More specifically, FIG. 3 illustrates specific configuration examples of the limiting current ratio calculation unit 22, the request limit coefficient calculation unit 23, and the final request value calculation unit 25.

As shown in FIG. 3, the limiting current ratio calculation unit 22 is a division unit 22. The request limit coefficient calculation unit 23 is a calculation unit 23 including a table. The final request value calculation unit 25 is a multiplier 25.

With such a configuration, the division unit 22 calculates a limiting current ratio (battery actual current value $I_B$/current limit value $I_L$) that is a ratio of the battery actual current value from the battery current sensor 10 to the current limit value from the current limit value setting unit 21. The division unit 22 then outputs the calculated limiting current ratio to the calculation unit 23.

The calculation unit 23 calculates a request limit coefficient corresponding to the limiting current ratio calculated by the division unit 22 with reference to the table.

Figure 4:
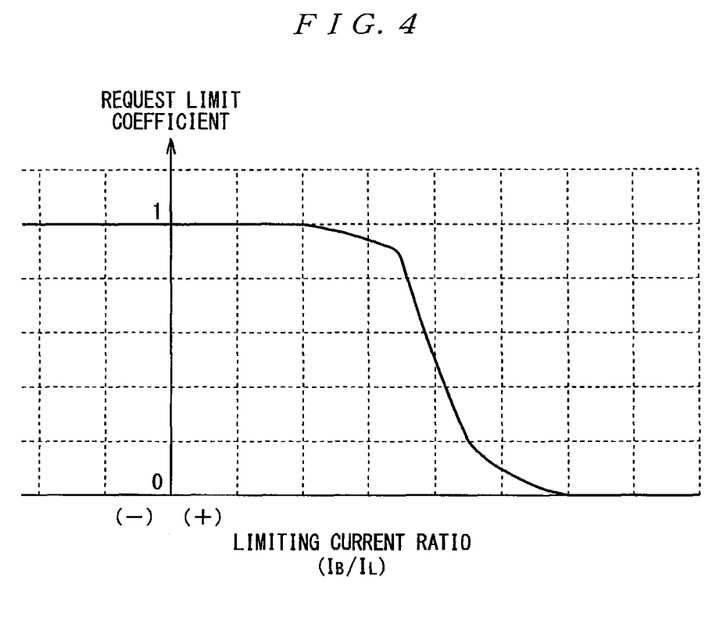
FIG. 4 is a characteristic graph illustrative of an exemplary relationship between limiting current ratio and request limit coefficient.

FIG. 4 is a diagram illustrative of an exemplary table that is used when the calculation unit 23 calculates a request limit coefficient.

As shown in FIG. 4, the table is constituted by a relationship between limiting current ratio and request limit coefficient.

Here, the request limit coefficient becomes smaller than 1, as the positive (+) limiting current ratio increases. Moreover, the request limit coefficient remains 1, even when the negative (−) limiting current ratio decreases (even when the absolute value of its limiting current ratio increases). That is, when the limiting input/output direction limited by a current limit value and the input/output direction of current for the battery 4 indicated by the sign of the battery actual current value are different, the limiting current ratio is negative (−). In this case, the request limit coefficient is always 1 regardless of the magnitude (magnitude of the absolute value) of the limiting current ratio.

The calculation unit 23 calculates a request limit coefficient corresponding to the limiting current ratio calculated by the division unit 22 with reference to such an exemplary table. Furthermore, the calculation unit 23 acquires the final request limit coefficient as a multiplication value resulting from multiplying the calculated request limit coefficient by a coefficient (e.g., coefficient equal to or less than 1) of the component used to calculate the final request value. The calculation unit 23 then outputs the calculated request limit coefficient (the request limit coefficient equal to or less than 1) to the multiplier 25.

The multiplier 25 calculates a final request torque by multiplying the request torque calculated by the hybrid controller 20 by the request limit coefficient calculated by the calculation unit 23.

The request torque or the final request torque is a value for driving the power generator motor 3 (namely power generating torque) and a value for powering-drive or regenerative drive of the drive motor 5 (namely drive torque or regenerative torque). Even for a request value (e.g., charger output request) for controlling the battery charger 9 to charge, the multiplier 25 calculates a final request value by multiplying the request value calculated by the hybrid controller 20 by the request limit coefficient calculated by the calculation unit 23, in the same manner as the processing for the request torque.

The hybrid controller 20 outputs the final request torque or the final request value calculated in the above manner to components (more specifically, a high-order controller such as an inverter or the like for controlling the respective components) such as the power generator motor 3, the drive motor 5, and the battery charger 9 giving that request.

(Operations)

Operations and functions of the hybrid controller 20 will be described next, with reference to an example illustrated in FIG. 5A to FIG. 5D.

Figure 5A:
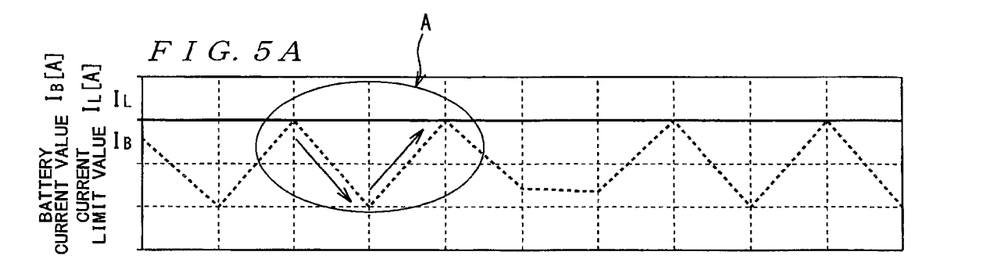
FIGS. 5A-5D are diagrams for describing operations and the like of the ECU.
Figure 5B:
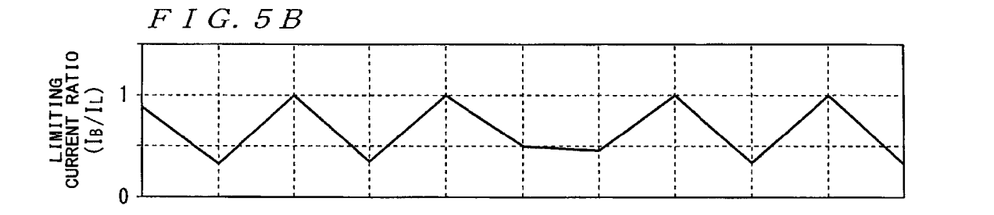
Figure 5C:
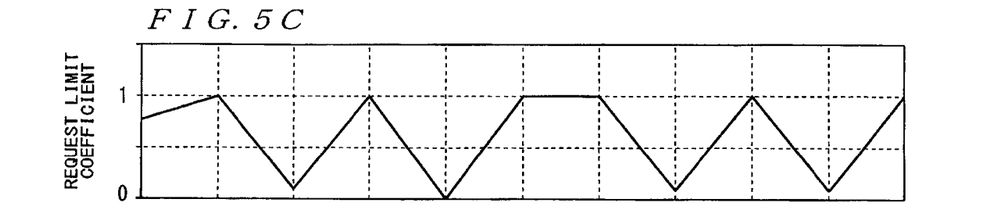
Figure 5D:
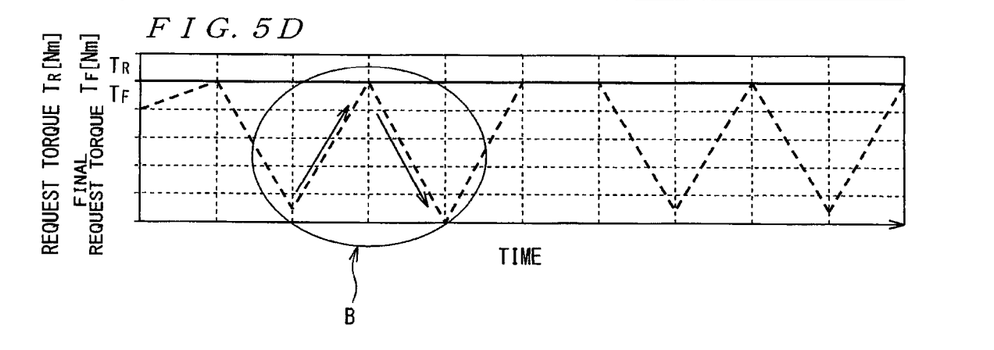

Here, FIG. 5A is a diagram illustrative of battery current value $I_B$ and current limit value $I_L$ to be input to the limiting current ratio calculation unit 22. FIG. 5B is a diagram illustrative of a limiting current ratio ($I_B/I_L$) calculated by the limiting current ratio calculation unit 22 based on the values input in that manner. FIG. 5C is a diagram illustrative of a request limit coefficient calculated by the request limit coefficient calculation unit 23 based on the limiting current ratio calculated by the limiting current ratio calculation unit 22. FIG. 5D is a diagram illustrative of a request torque $T_R$ and a final request torque $T_F$ calculated based on the request limit coefficient calculated by the request limit coefficient calculation unit 23 and the request torque $T_R$.

The example illustrated in FIG. 5A to FIG. 5D is a case where the current limit value $I_L$ and the request torque $T_R$ are constant values.

As shown in FIG. 5A and FIG. 5B, when the battery current value $I_B$ becomes smaller than the current limit value $I_L$ and a gap therefrom becomes great, the hybrid controller 20 calculates a limiting current ratio such that it becomes smaller in accordance with the gap size. Moreover, as shown in FIG. 5C, the hybrid controller 20 calculates a request limit coefficient corresponding to the calculated limiting current ratio. As shown in FIG. 5D, the hybrid controller 20 calculates a final request torque by multiplying the calculated limiting current ratio by the request torque.

As a result, as the battery current value $I_B$ becomes closer to the current limit value $I_L$, the hybrid controller 20 calculates the final request torque made smaller than the request torque, as illustrated at A and B in FIG. 5A and FIG. 5D. That is, the hybrid controller 20 increases the degree of limitation on the request torque, as the battery current value $I_B$ becomes closer to the current limit value $I_L$.

In addition, when the battery current value $I_B$ becomes smaller than the current limit value $I_L$ and a gap therefrom becomes great, the hybrid controller 20 calculates the final request torque same as the request torque. That is, when the battery current value $I_B$ becomes smaller than the current limit value $I_L$ and a gap therefrom becomes great, the hybrid controller 20 loosens the degree of limitation on the request torque.

Moreover, when the sign of the battery current value and that of the current limit value are different, namely when the input/output direction of current indicated by the battery current value and input/output direction of current limited by the current limit value are different, the request limit coefficient is always 1, as shown in FIG. 4. Thereby, the request torque is output as the final request torque without any limitation.

In this manner, the hybrid controller 20 is capable of limiting the input/output current to/from the battery 4. Furthermore, the hybrid controller 20 limits the request torque according to the request limit coefficient finally calculated by setting the current limit value or the like. Thus, controller 20 is capable of limiting the input/output current to/from the battery 4 so as to protect the battery 4 without monitoring the state of a target component which is driven based on the request torque or the input/output current thereof.

Figure 6:
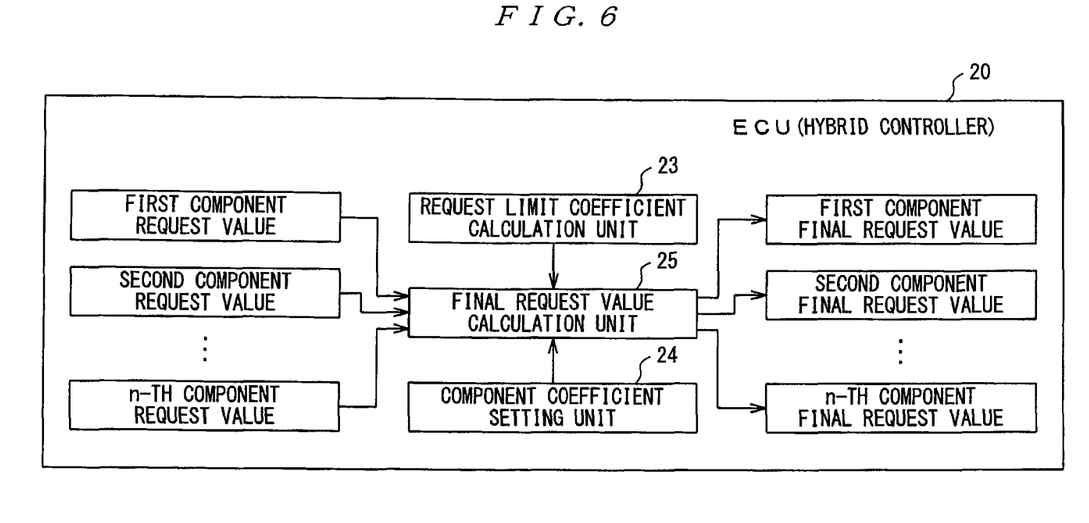
FIG. 6 is a diagram for describing limitations on request values for multiple components.

FIG. 6 is a diagram illustrative of an example of limitation on request values (including request torque) for multiple components. Therefore, in the example of FIG. 6, the first through the n-th component request values are input to the final request value calculation unit 25. In this case, respective components are, for example, the power generator motor 3, the drive motor 5, the battery charger 9, and the like.

As shown in FIG. 6, the final request value calculation unit (e.g., multiplier) 25 calculates the first through the n-th component final request values based on the first through the n-th component request values, the request limit coefficient calculated by the request limit coefficient calculation unit (e.g., operation unit) 23 and coefficients for the respective component request values set by the component coefficient setting unit 24.

More specifically, the final request value calculation unit 25 calculates the first component final request value by multiplying the first component request value by the request limit coefficient and a coefficient (e.g., coefficient less than or equal to 1) for the first component request value. In other words, the final request value calculation unit 25 sets the multiplication value resulting from multiplying the request limit coefficient by the coefficient (e.g., coefficient less than or equal to 1) for the first component request value, as the final request limit coefficient for the first component, and multiplies the request limit coefficient for the first component and the first component request value to calculate the first component final request value.

In the same way, the final request value calculation unit 25 calculates the second component final request value by multiplying the second component request value by the request limit coefficient and a coefficient (e.g., coefficient less than or equal to 1) for the second component request value. In that manner, the final request value calculation unit 25 calculates the n-th component final request value by multiplying the n-th component request value by the request limit coefficient and a coefficient (e.g., coefficient less than or equal to 1) for the n-th component request value.

Here, the coefficients for the respective component request values are set based on the priority or the like, which is determined by indicators of a case where each component is driven by the priority or the like.

The hybrid controller 20 multiplies the respective component request values by the respective component request limit coefficients, so as to calculate the final request values for the respective components in this manner. As a result, the hybrid controller 20 is capable of limiting the current input/output to/from each component, such as the power generator motor 3, the drive motor 5, or the battery charger 9, etc., which inputs/outputs current to/from the battery 4, without monitoring the input/output current or the state of each component.

More specifically, as illustrated in FIG. 1, the hybrid controller 20 is capable of limiting a power generation request for the power generator motor 3 in order to limit the input of the generated electric power to the battery 4, when limiting the input/output current to/from the battery 4. Moreover, the hybrid controller 20 is capable of limiting a regenerative torque request for the drive motor 5, when limiting the input of the regenerative electric power to the battery 4. Furthermore, the hybrid controller 20 is capable of limiting a drive torque request for the drive motor 5, when limiting the output for electric power for powering from the battery 4. Yet even further, the hybrid controller 20 is capable of limiting a battery charger output request for the battery charger 9, for limiting the input of the charging power to the battery 4.

The hybrid controller 20 is also capable of protecting the battery 4 by limiting the input/output current to/from the battery 4 through the above limitations.

In the description of the present embodiment heretofore, the battery current sensor 10 constitutes a battery input/output current index value acquiring unit, for example. Moreover, the current limit value setting unit 21 constitutes a limit value setting unit, for example. Furthermore, the limiting current ratio calculation unit 22 constitutes a ratio calculation unit, for example. The request limit coefficient calculation unit 23 constitutes a limit coefficient calculation unit, for example. The final request value calculation unit 25 constitutes a final request value calculation unit, for example.

Modifications to the Embodiments

The power generator motor 3, the drive motor 5, and the battery charger 9 have been given as specific examples in the present embodiment, but the present invention is not limited thereto as long as it is a component for inputting and outputting the current to and from the battery 4.

Moreover, in the present embodiment, the final request limit coefficient is calculated based on the request limit coefficient calculated by the request limit coefficient calculation unit 23 and the coefficients for the respective component request values set by the component coefficient setting unit 24, but the present invention is not limited thereto. For example, in the present embodiment, without the provision of the component coefficient setting unit 24, the request limit coefficient calculation unit 23 may be configured to acquire the request limit coefficient corresponding to the limiting current ratio for every component, by providing tables each including the relationship between the limiting current ratio and the request limit coefficient for every component and by referring to the respective tables.

Additionally, the hybrid controller 20 in the present embodiment may acquire a power value that is a multiplication value of a battery current value and a battery voltage value to set as a limit value the power value that limits the input and output power to/from the battery 4. Then, the request limit coefficient calculation unit 23 may calculate the request limit coefficient based on a ratio of the set limit value (e.g., power limit value) to the acquired power value (more specifically, the acquired power value/the power limit value).

While the embodiments of the present invention have been described in detail, the present invention is not limited to the illustrated and described exemplary embodiments, and includes all embodiments giving the same results as the object of the present invention. Moreover, the present invention is not limited to characteristic combinations of the invention claimed in Claim 1, and may be provided having any desired combination of specified characteristics of all of the respective characteristics disclosed herein.

REFERENCE SIGNS LIST

1: hybrid system, 2: engine, 3: power generator motor, 4: battery, 5: drive motor, 9: battery charger, 10: battery current sensor, 20: hybrid controller (ECU), 21: current limit value setting unit, 22: limiting current ratio calculation unit, 23: request limit coefficient calculation unit, 24: component coefficient setting unit, and 25: final request value calculation unit

The invention claimed is:

1. A battery protector for protecting a battery of a vehicle including an engine, a power generator motor driven by the engine and controlled based on a request value, a drive motor to be controlled based on a request value and to drive driving wheels, a battery for storing generated electric power from the power generator motor and regenerative power from the drive motor and for supplying electric power for powering to the drive motor, the battery protector comprising:

a battery input/output current index value acquiring unit for acquiring an index value for input/output current to/from the battery;

a limit value setting unit for setting a limit value for limiting the input/output current to/from the battery in accordance with a state of the battery;

a ratio calculation unit for calculating a ratio of the limit value set by the limit value setting unit to the index value acquired by the battery input/output current index value acquiring unit;

a limit coefficient calculation unit for calculating a limit coefficient for limiting a request value for driving respective vehicle components including at least the power generator motor and the drive motor for carrying out input/output of current to/from the battery based on the ratio of the limit value calculated by the ratio calculation unit; and a final request value calculation unit for calculating respective multiplication values resulting from multiplying the respective request values for the respective vehicle components by the limit coefficient calculated by the limit coefficient calculation unit, as a final request value for drive controlling of the respective vehicle components.

2. The battery protector of claim 1, wherein:

the battery input/output current index value acquiring unit acquires a battery current value as the index value, the limit value setting unit sets as the limit value, a current value for limiting the input/output current to/from the battery, and the ratio calculation unit calculates a ratio of the limit value set by the limit value setting unit to the battery current value acquired by the battery input/output current index value acquiring unit.

3. The battery protector of claim 1, wherein:

the battery input/output current index value acquiring unit acquires as the index value a multiplication value by multiplying the battery current value by the battery voltage value, the limit value setting unit sets as the limit value a power value for limiting the input/output power to/from the battery, and the ratio calculation unit calculates a ratio of the limit value set by the limit value setting unit to the multiplication value acquired by the battery input/output current index value acquiring unit.

4. The battery protector of claim 2, wherein the ratio calculation unit increases the ratio, as the battery current value becomes closer to the limit value, and the limit coefficient calculation unit decreases the limit coefficient, as the ratio increases.

5. The battery protector of claim 1, wherein the limit coefficient calculation unit calculates the limit coefficient for every one of the respective vehicle components.

* * * * *